Aug. 14, 1951     L. L. SALTON     2,563,875
WARMING TRAY
Filed Oct. 10, 1949
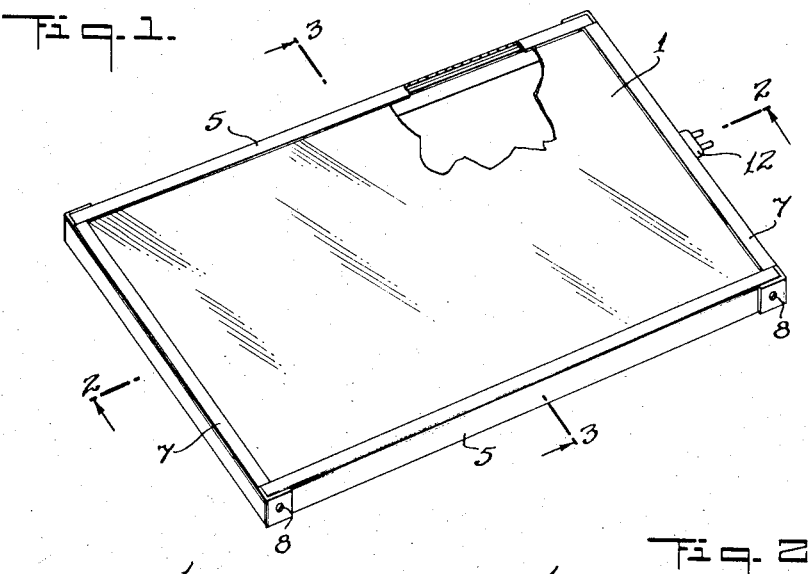
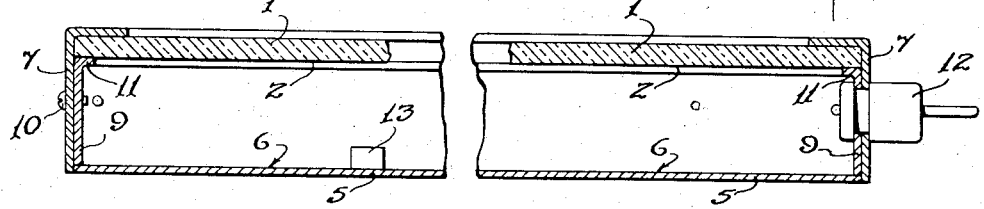
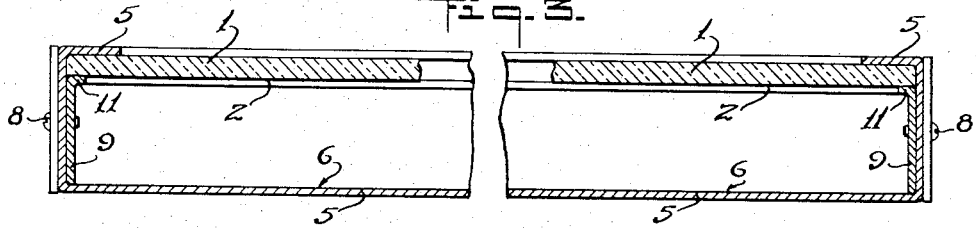
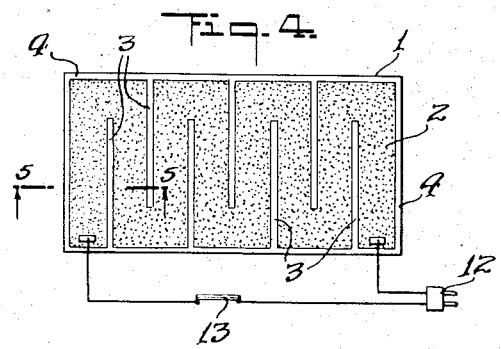
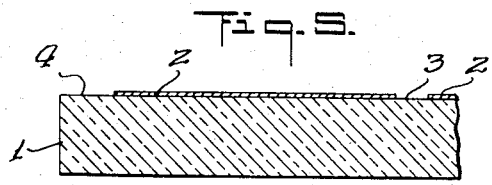
*INVENTOR.*
LEWIS L. SALTON
BY Adams, Forward
and McLean
ATTORNEYS Patented Aug. 14, 1951

2,563,875

UNITED STATES PATENT OFFICE 2,563,875

WARMING TRAY

Lewis L. Salton, New York, N. Y.

Application October 10, 1949, Serial No. 120,516

1 Claim. (Cl. 219—19)

This invention relates to a portable serving tray comprising electrical heating means associated therewith, enabling hot food prepared in the kitchen and placed thereon to be conveniently transported to the dining room or porch and to be kept hot until it is desired to serve the food.

The mobile heating tray of the present invention is particularly useful in a home wherein there is no domestic help, since it enables the housewife to place the food for the entire meal upon the tray, thereby rendering unnecessary trips to the kitchen during the course of the meal with consequent disruption of the entertainment of any guests who may be present.

In a tray of the type indicated, it is of importance for the convenience of the housewife, that it be so constructed as to heat up rapidly, for example, in less than about five minutes, to its normal operating temperature of about 200° F., this temperature being chosen because food does not dehydrate too rapidly at it.

Also, in a tray of the type indicated, it is advisable to make its food supporting surface of glass, because glass is a poor heat conductor and as a result is less apt than metal to burn the user who accidentally touches the hot surface.

It is an object of this invention to provide such a tray having a glass top, composed of ordinary glass (as distinguished from Pyrex glass) which has been subjected to a heat tempering process and thereby made shatter-proof and heat resistant, the glass having on one side a coating of metal suitably interrupted so that the metal may serve as an electrical resistance heating element.

Various considerations enter into the design of a tray of the type indicated. Thus, to accomplish rapid heating to 200° F., the wattage of the heating element must be such that, if not controlled, it would raise the temperature of the glass to 300–400° F. Also, so as not to damage the surface upon which the tray is placed, a heat reflecting surface must be placed below the heating element, and the heat reflecting surface must be spaced away from the heating element to prevent heat conduction through the reflecting surfaces. Therefore, the glass plate must be supported, preferably along its edges. This necessitates an unheated section along the edge of the glass of at least one-fourth inch for thermal and electrical insulation purposes. Moreover, if one provides such a tempered glass plate with an unheated margin of one-fourth inch or more, at temperatures above 300° F., the resultant thermal tension in the glass may be sufficient to break it, and therefore in the present tray there is provided a thermostat limiting the temperature of the plate to about 200° F., this thermostat making possible the use of such a wide unheated margin and at the same time holding the plate at its proper temperature for use as a food warmer with the advantage of the rapid heat-up.

The object of the present invention is accomplished by providing a tray of the type indicated having a food-utensil supporting surface made of glass of the aforementioned type. The normal operating temperature of the tray, when connected to the usual household electrical supply of 110 volts and without the use of thermostatic means for controlling the temperature, is somewhat more elevated than that most desired for normal operation, for example, 300–400° F. In the heating circuit, there is connected in series a bimetallic thermostat of conventional design which is responsive to the temperature of the tray and regulates that temperature by making and breaking the electrical circuit which supplies the energy for the heating.

For a more complete understanding of the heating tray of the present invention, reference is made to the accompanying drawing which illustrates a specific embodiment thereof and in which:

Fig. 1 represents a perspective view of the tray partially in section;

Fig. 2 represents a section taken along the line 2—2 of Fig. 1;

Fig. 3 represents a section taken along the line 3—3 of Fig. 1;

Fig. 4 represents a view of the bottom of the metallized glass, also indicating the electrical circuit; and Fig. 5 represents a section taken along the line 5—5 of Fig. 4.

In the drawing, the numeral 1 designates the glass plate which forms the surface of the tray, the glass having a metallic coating 2 which serves as the heating element, such coating being interrupted by non-conducting areas 3 which require the current to take an elongated path in passing through the conductor. The numeral 4 also designates a non-conducting area which extends around the margin of the glass and which is substantially one-fourth inch or more in width, this particular dimension, for the reasons given above, constituting an important feature of the present tray. Such a glass may be conveniently manufactured by applying the metallic surface to a glass plate, suitable templates covering the glass during the application of the metal in order that the desired non-conducting surface will remain.

Still referring to the drawing, the numeral 5 represents a metallic plate having an upper heat reflecting surface 6, the plate being formed with L-shaped sides in the manner shown to provide two of the sides of the box-like structure and thus aid in holding the glass in place. The numerals 7 denote formed, L-shaped sheets of metal which are fastened to the metallic plate 5 by means of the screws 8, the sheets 7 also serving to form the sides of the box-like structure.

Also located within the box-like structure are four L-shaped plates 9 which are formed with flanges 11, the flanges providing a supporting surface for the glass around its entire periphery. This results in a structure in which the glass is supported around its perimeter, an uncoated area at least one-eighth inch wide being immediately within the area of support to provide the necessary insulation, so that the metallic conductor 2 will not be short circuited by the metallic members which support the glass forming the tray surface. Alternatively, instead of being supported around its entire perimeter, the glass may be supported at a plurality of points only, so long as the space between the points of support and the heating element is at least one-eighth inch wide.

Referring specifically to Figs. 1 and 2, the numeral 12 signifies an electric plug, the leads of which are connected to the extremes of the metallic conductor 2, one lead being so connected through a bimetallic thermostatic element 13 which is responsive to the temperature of the tray, maintaining the surface of the glass plate at about 200° F. during use. The electrical circuit is shown diagrammatically in Fig. 4.

To use the apparatus, the power is first connected, resulting in a rapid heating of the tray, which heating is intermittently interrupted by the thermostat when the operating temperature of about 200° F. is attained. The meal to be served is then placed in dishes upon the tray and the power is disconnected. After the tray is carried into the room where the meal is to be served, the power is turned on again, in order to maintain the food at its proper temperature.

I claim:

A glass heating tray of the character described comprising a metallic base structure having an upper border means and a lower supporting means forming a glass embracing means which extends horizontally inwardly of said base structure, a sheet of tempered glass horizontally and embraceably mounted in said glass embracing means in a manner such that the perimeter of said glass is supported at at least a plurality of points, said perimeter of said glass extending horizontally outwardly over at least one-eighth inch of said lower supporting means, electrical means for heating said sheet including a resistance heating element attached to the bottom of said sheet, said resistance heating element being spaced horizontally inwardly from the lower supporting means at least one-eighth inch, a metallic plate having a heat reflecting surface horizontally mounted on said metallic base structure below said glass in spaced relation thereto, electrical power supply means connected to said resistance heating element and adapted to supply sufficient power to insure a rapid heating of said glass, and electrical control means including a thermostatic control so constructed and arranged as to interrupt the power supply to maintain the temperature of the surface of said glass at about 200° F. during operation, the said resistance heating element having such value that the temperature of the surface of the tray would rise substantially above 200° F. if the thermostatic control remained closed.

LEWIS L. SALTON.

REFERENCES CITED

The following references are of record in the file of this patent:

UNITED STATES PATENTS

| Number | Name | Date |
|---|---|---|
| 1,871,705 | Keul | Aug. 16, 1932 |
| 2,119,680 | Long | June 7, 1938 |
| 2,187,196 | Douglass | Jan. 16, 1940 |
| 2,486,148 | Glynn et al. | Oct. 25, 1949 |

FOREIGN PATENTS

| Number | Country | Date |
|---|---|---|
| 13,989 | Great Britain | June 17, 1913 |
| 118,300 | Great Britain | Aug. 19, 1918 |